Dec. 9, 1924.
J. B. GRIFFIN
1,518,917
TYPEWRITER TYPE SOLDERING AND ALIGNING APPARATUS
Filed Aug. 15, 1921
4 Sheets-Sheet 2
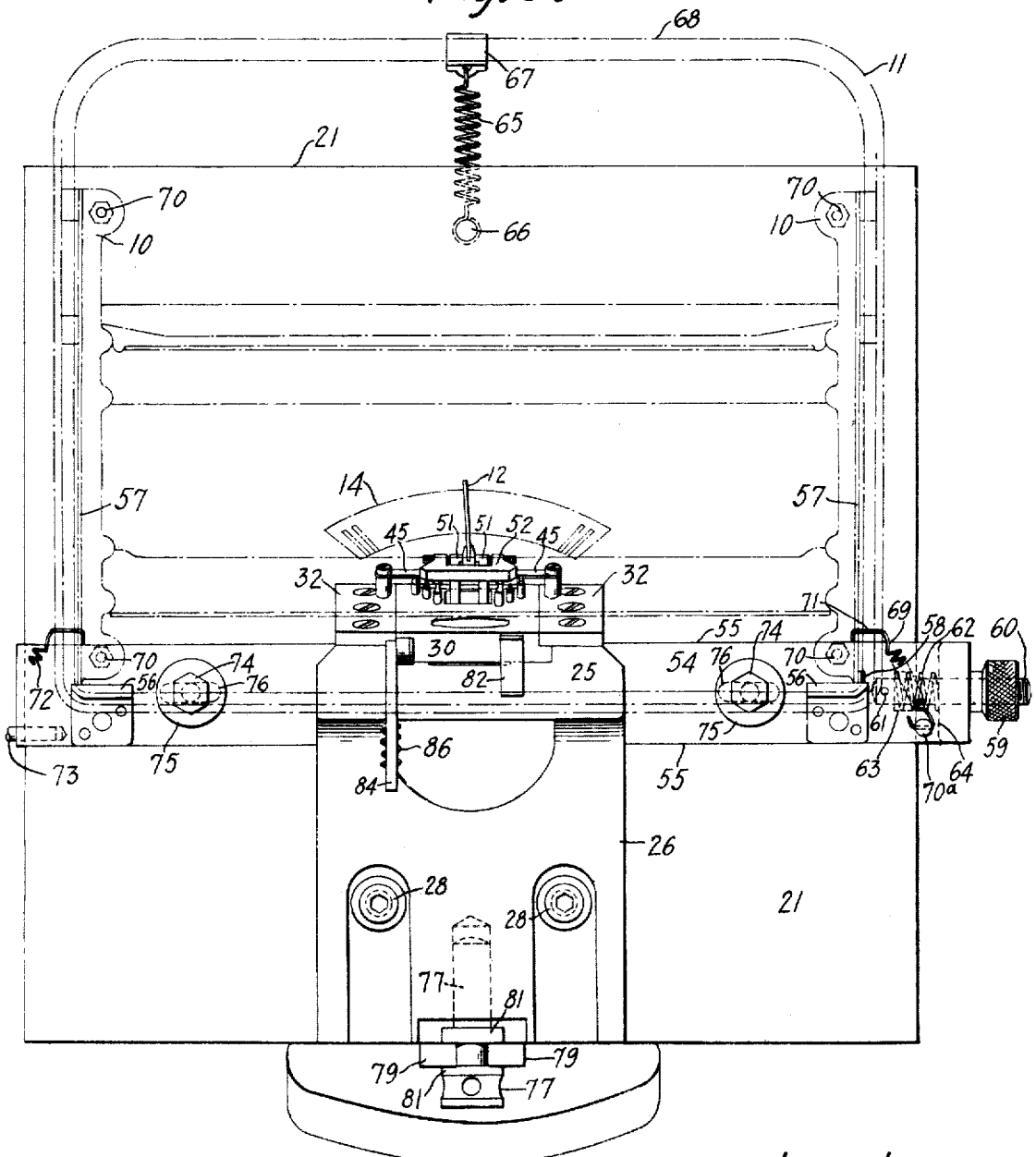

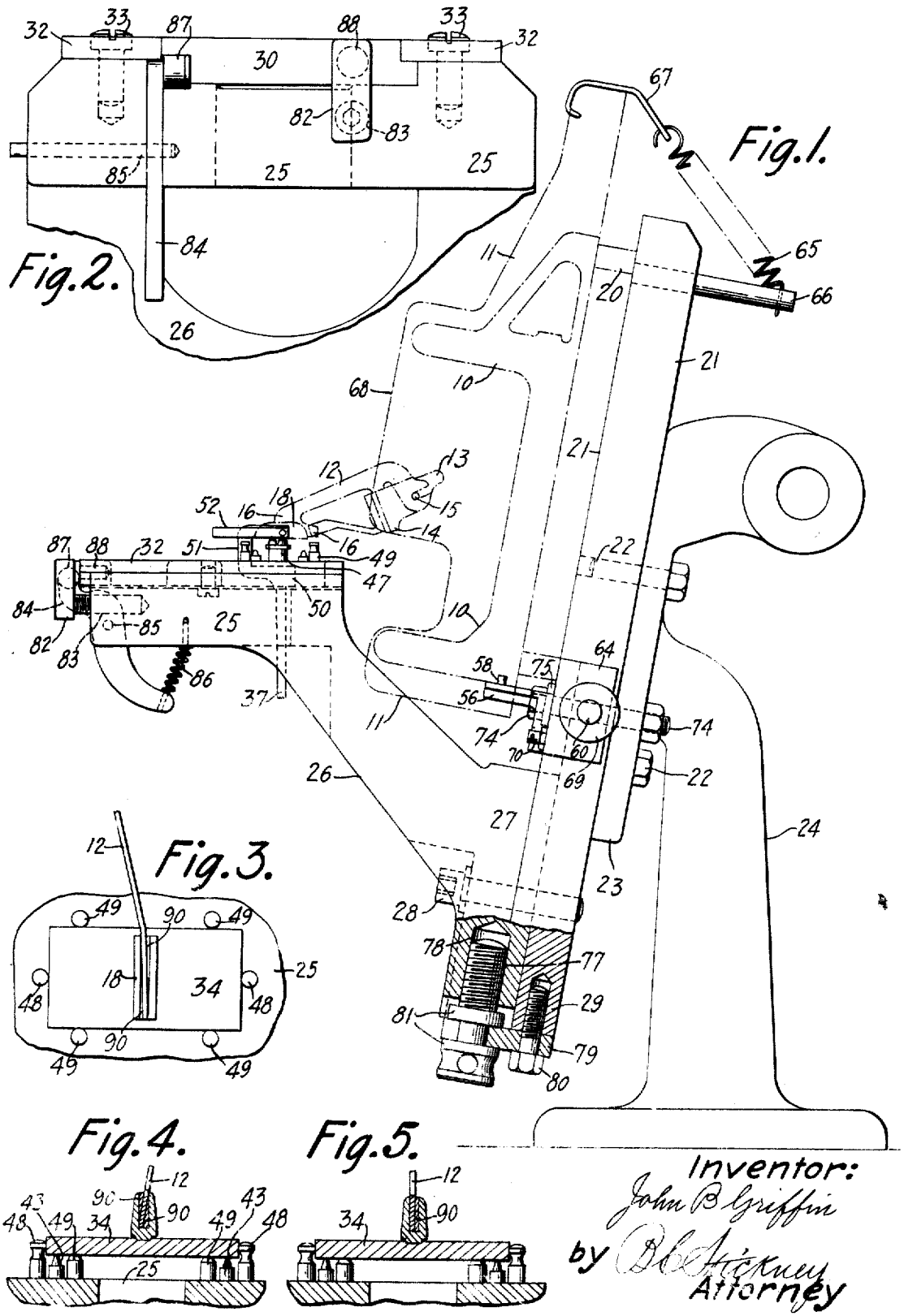

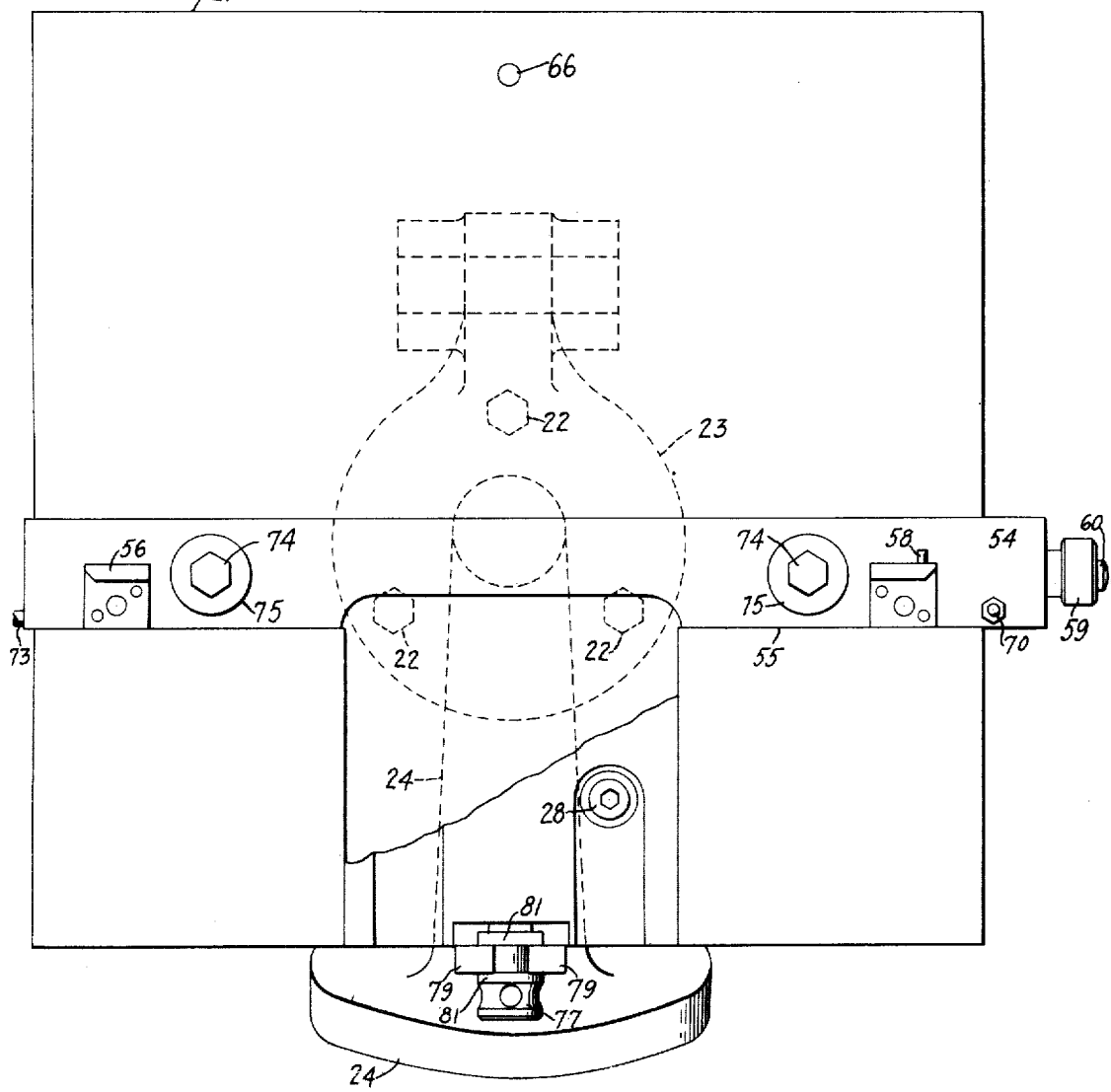

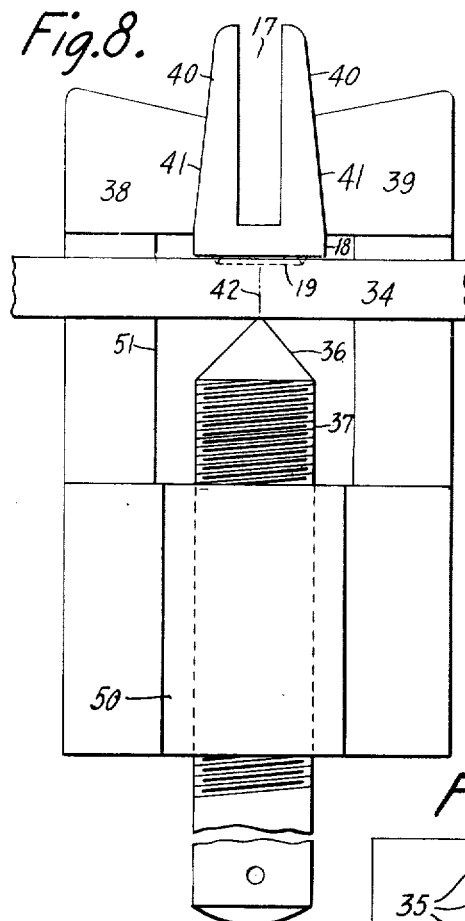
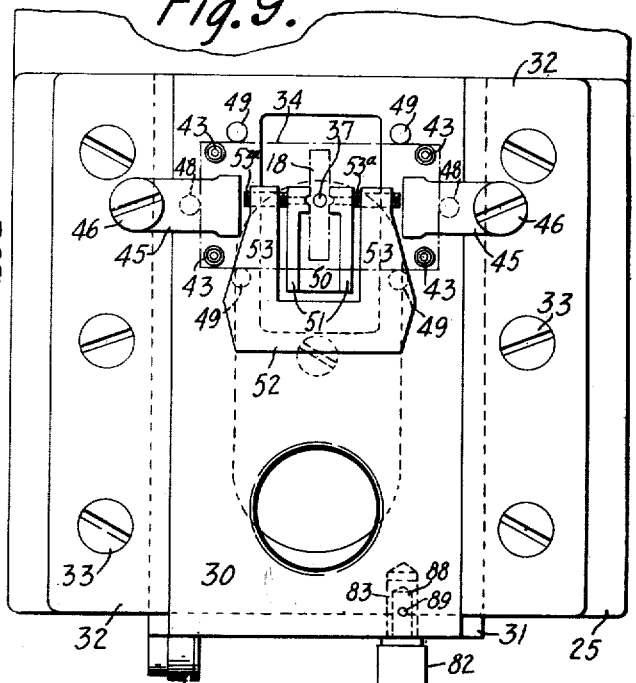
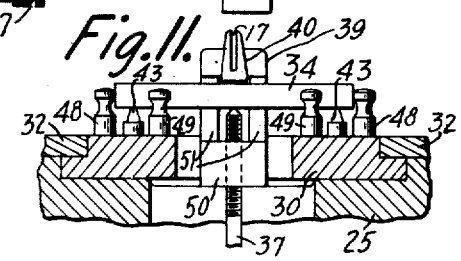
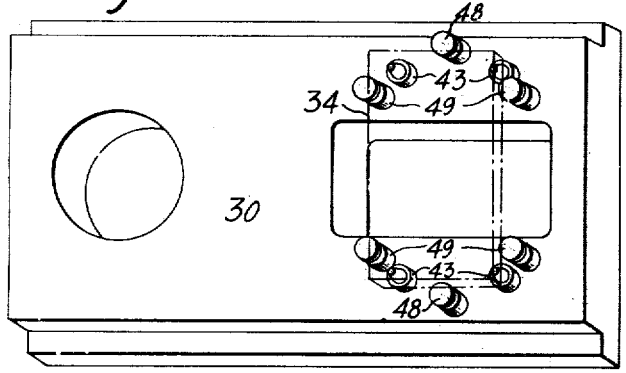
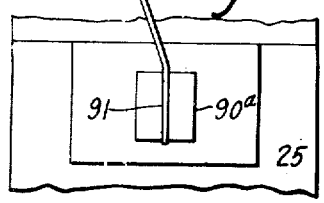
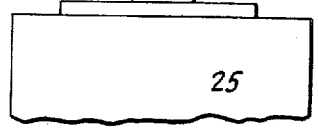
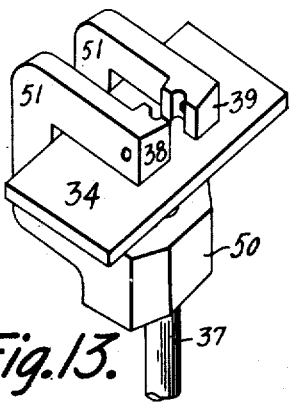

Patented Dec. 9, 1924.

1,518,917

UNITED STATES PATENT OFFICE.

JOHN B. GRIFFIN, OF NEWINGTON, CONNECTICUT, ASSIGNOR TO UNDERWOOD TYPEWRITER COMPANY, OF NEW YORK, N. Y., A CORPORATION OF DELAWARE.

TYPEWRITER-TYPE SOLDERING AND ALIGNING APPARATUS.

Application filed August 15, 1921. Serial No. 492,576.

*To all whom it may concern:*

Be it known that I, JOHN B. GRIFFIN, a citizen of the United States, residing in Newington, in the county of Hartford and State of Connecticut, have invented certain new and useful Improvements in Typewriter-Type Soldering and Aligning Apparatus, of which the following is a specification.

This invention relates to means for fastening typeheads to the type-bars of writing machines.

Heretofore the type-bar and type-head have been closely fitted together and then secured by solder, the position of the type itself being dependent upon the accuracy or inaccuracy of the type-bar construction; and the matter of accuracy of the type-impressions has been left for the subsequent care of the expert aligner. If the type-bar is originally bent a little to one side or the other, or twisted, or too short or long, these defects will produce inaccurate and misaligned type-impressions, and the impressions of the individual type will be uneven. Skilled labor has been requisite for the soldering, and more highly skilled labor for twisting, bending, shortening, lengthening and other manipulation of the type-bars, to bring the types fixed thereon to print in exact alignment, also to make each type level, so that it will print evenly or be "on its feet". One of the most serious difficulties arises from the unevenness of the type-impression, and this fault is frequently accompanied with lack of vertical alignment, and in some cases with faulty lateral alignment also; these troubles being aggravated where each type has more than one type-face, as is the custom. It is one aim of the present invention to minimize or avoid these difficulties and expedite the operation and reduce the cost of effecting the attachment and alignment of the types; and to this end one of the features of the invention consists in fixing the type-heads upon the type-bars in the first place in their final printing positions, even though the type-bar tips themselves may be a little out of true in various ways; whereby very little attention is subsequently needed from the skilled aligner, thus enabling him to turn out many more machines in a given period, and expediting the work, as well as increasing the factory output. The types may be rapidly attached to the type-bars in this accurate manner, and the need for skill is reduced, and the cost is low. To accomplish these ends, two of the obstacles to be overcome are, first, to locate the type with a super-accuracy heretofore unknown in this art, and to do so cheaply; and second, to fix and maintain this super-accurate relationship of the type to the platen or the printing point of the machine, notwithstanding the great variety of inaccuracies usually existing in the typebars upon which the types are soldered, and the consequent variation in their printing positions.

The invention is illustrated in connection with the type-bars of the well known Underwood portable typewriter, in which frontstrike type-bars are pivoted in a slotted segment. The invention is preferably practised after the segment, with the type-bar blanks pivoted thereto, has been assembled in the frame-work of the typewriting machine. The typewriting machine in unfinished condition is accordingly mounted in a soldering jig, and the type-bars are swung, one after another, to the positions which they occupy in the typewriting machine when the types strike on the paper, or, in other words, to their printing positions. In this illustration each pivoted type-bar or blank consists of a thin blade of sheet-metal, and the tips of these blades all occupy substantially the same position when at the printing point. They are therefore swung one after another to bring their tips or free ends to this common position. Arranged at this central point is a soldering jig in which is cradled a type. This type, by the use of gages, is located at the exact position (relatively to the framework of the typewriter) that it is to occupy when printing on the work-sheet in the completed typewriter. That is to say, the type is in exact up-and-down or vertical alignment, and is also in exact sidewise alignment, and is also precisely level or "on its feet". The type is located or finally and permanently aligned and trued up in this manner while unconnected with its type-bar. While the type is thus held, independently of its type-bar, in this precise relationship to the typewriting machine, the selected type-bar is swung to cause its tip to enter a longitudinal slot, groove or depression formed in the back of the type; and while in such position the slot in the type is filled up with the solder, whereby the type is finally attached to the type-bar.

One of the features of the invention, in the preferred manner of practising the same, resides in making the type-slot oversize. The type-bar tip does not fill the slot of the type, sufficient clearance being left to allow for slight inaccuracies in the form or position of the type-bar itself or of the tip thereof, and the two parts being rigidly connected by the solder in this relation, so that the type-bar, although out of true or not positioned with high accuracy with respect to the type in the jig, is still enabled to carry the type to its exact intended position against the platen of the typewriting machine. This feature is valuable not only in respect to the up-and-down alignment of the type-impression, where a variation of even one-thousandth of an inch is objectionable, and not only in regard to the exactness of the lateral positions of the type-impressions, but also in regard to the evenness of each impression. Inasmuch as, according to the present invention, each type is itself gaged to precisely the right position in the jig, the type-bar tips may occupy other than their true positions in the slots, which they do not fill. Allowance is made for the variations in printing positions of the different type-bars, the misfit between the type-bar and the type being taken up or compensated for by the solder, which fills the slot in the type and holds the two together in their relative positions, whatever they may be, even though the bar may be itself a little to one side or the other relatively to the slot in the type, or even though the bar may be a trifle twisted, since the unequal or uneven spaces around the type-bar in the slot of the type are all filled up by the flowing solder. Hence, even though the type-bar blank may be imperfectly formed, yet the impression of the type on the work-sheet gives no evidence of such imperfection; or, in other words, the result is a type that is correctly mounted in every way on the type-bar, with reference to the platen, not yet placed in the machine, but upon which the type is designed to strike.

Owing to such accurate universal preparatory and independent gaging of each type in the jig in the precise soldering position that is occupied by all the other types, it results that, upon subsequently testing or operating the finished typewriting machine, the type impressions are found to be even and also in exact alignment in every way; or at least this result is so closely approximated that but little remains to be done beyond inspection and touching up of a type-bar here and there.

Previously to placing the typewriter in the soldering fixture, the type-bars or blanks themselves may be tested by placing in a suitable jig the unfinished typewriter, containing the type-bar segment, and by bringing the tips of the bars one after another to a slotted central gage. At this time the type-bars may be individually adjusted by bending them to one side or the other, or by twisting, shortening, lengthening or otherwise treating them in order to bring the tips to the proper fit in the slotted gage. This fit should be comparatively close. This treatment of the type-bars is relatively simple and inexpensive, as compared with corresponding treatment of the bars as heretofore practised after the attachment of the types to the type-bars. Moreover, in this preparatory treatment the type-bars do not need to be treated with the exquisite delicacy or skill that has been necessary heretofore in aligning all the types after attachment. A slight latitude may be allowed in fitting the type-bar into the slotted gage, so as not to render said fitting objectionably expensive. It may be performed by comparatively unskilled labor; and such discrepancies as may exist in the positions of the tips of the type-bars are compensated for or taken up as the type-bars are soldered to the types.

One of the valuable features of the invention resides in the method employed in positioning the type in the soldering jig with accuracy in respect to the framework of the typewriting machine, and therefore in respect to the platen which is subsequently to be mounted upon said framework. The type itself is small and frail, and presents difficulties when attempting to locate it in a jig with the requisite exactness, and without reliance upon highly-skilled, slow and expensive labor. In dealing with this problem, instead of attempting to set the type itself up against vertical, lateral and leveling fixed gages, it is temporarily set into a cradle. In order to secure the requisite accuracy, the cradle has preferably a matrix, in which the type-face is placed. The matrix may correspond exactly with the type-face, whereby exact positioning of said type in every way on the type-head is mechanically determined. The cradle, with the type so located therein, may then be easily and correctly positioned in the jig by means of fixed gages, so as to bring the type carried by the cradle to the exact required position corresponding with the printing position of the same in the typewriting machine. For readily and accurately positioning the cradle, it is made of ample dimensions, and is preferably in the form of a relatively heavy plate.

The type is clamped to the gaging cradle by means of a device which insures accurate relationship between the type-head and the cradle. This clamp comprises opposing cheeks between which the type is inserted. The sides of the type-head are slightly beveled, and said cheeks are correspondingly formed, so that the type is sure to come to a seat when pressed in between said cheeks. The type is inserted face down in this seat, so that the slotted back of the type lies uppermost, for convenience in soldering the type-bar in the slot. The clamp is provided with a screw point which bears against the cradle and clamps it against the type. The axial line of this clamping screw is perpendicular to the type-face, and said line is central of the type, so that upon turning the screw the type-face is forced to fit accurately in the matrix portion of the cradle. Hence when the cradle is subsequently placed in the soldering jig, it results that the face on said type is in exactly the right position relatively to the type-segment or to the framework of the typewriting machine. Since said clamping screw point is midway of the type considered both longitudinally and laterally, it results that as the screw is tightened the cradle may be settled or rocked thereby about both its longitudinal and lateral axes until exact seating of the type-faces into the matrix is insured. The cradle, with the type and clamp both attached thereto, forms a unit which is then placed in the jig, and there held during the operation of soldering a type-bar to the type.

Other features and advantages will hereinafter appear.

In the accompanying drawings,

Figure 1 is a part-sectional side elevation of a type-soldering or gaging apparatus embodying the present improvements in one form.

Figure 2 is a detail, being a front elevation, showing the end of the type-carrying slide and the bed on which it is mounted.

Figure 3 is a diagrammatic plan showing in an exaggerated manner an improper bending or misformation of the type-bar, and the consequent lack of fit thereof in the type-slot; with solder filling the irregular interstices between the type-bar and the type.

Figure 4 is a sectional front elevation, showing diagrammatically and also in an exaggerated manner a type-bar twisted out of proper shape, and therefore occupying an incorrect position in the type-slot; the irregular interstices between the type-bar and the type being also filled by solder.

Figure 5 is a view similar to Figure 4, but showing the type-bar as improperly bent to one side, and showing the solder as filling the remaining space in the type-slot.

Figure 6 is a front elevation of the apparatus or fixture, showing in dot-and-dash lines a typewriting machine gaged therein and a type-bar swung into engagement with a type which is also gaged in the machine.

Figure 7 is a front elevation of the upright table upon which the framework of the machine is gaged, as at Figure 6; the type-soldering jig being omitted from this figure.

Figure 8 is a detail, being a rear elevation, of a unit comprising a type, a clamp in which the type is seated, and a cradle or gage-block forced into engagement with the face of the type by means of a set screw in one of the jaws of the clamp.

Figure 9 is a plan of the type-soldering jig, showing the slide which carries the type, the bed in which the slide works, and other details.

Figure 10 is a perspective view of a type-cradle forming a gage-block, this type-cradle having a matrix portion to receive the type-face, and having accurately squared portions for gaging it in the jig.

Fig. 11 is a sectional rear elevation through the slide, the unit gaged therein (comprising the parts seen at Figure 8), and the bed in which the slide works.

Figure 12 is a perspective view of the slide with the gages thereon.

Figure 13 is a perspective view of the unit seen at Figure 11.

Figures 14 and 15 show in plan and front elevation a gaging jig for aiding in effecting a preliminary truing up of the type-bars; this fixture being the same in all respects as that seen at Figures 1, 6 and 7, except that in place of the type-soldering jig there is substituted a slotted gage into which to fit the tips of the type-bars; the slot in this gage being preferably a little narrower than the slots in the types.

The Underwood portable typewriting machine comprises an inner framework 10 and an outer framework 11 fixed thereto. The inner framework may be used for gaging the typewriter upon the soldering fixture. Flat sheet-metal type-bars 12 swing in radial guide-slots 13 in a segment 14, the latter fixed upon the typewriter framework. So long as the types are accurately gaged, it is not necessary in all cases to gage the type-bar system by means of another portion of the typewriter. It will be observed that the type-soldering jig has means to connect it with the type-bar system. This means comprises, in this form of the invention, a bedwork or fixture to which are attached the soldering jig and also the typewriter framework having the type system mounted therein. The type-bars swing upon a curved pivot wire 15, and their tips are formed with heads or ribs 16 to be set into longitudinal slots 17 formed in the backs of types or type-blocks 18, the latter having on their faces the usual type-faces 19 in relief, and said slots being preferably oversize.

Said typewriting machine is usually provided with four rubber feet; but for the purpose of this invention there may be attached four temporary gaging studs 20, to serve in place of said rubber feet, for locating the typewriter frame with the requisite accuracy upon the front face of an upright table or tablet 21. This table is shown bolted at 22 to the face of a plate 23 carried upon a pedestal 24, which may be secured upon a work bench. The curved fulcrum wire 15 of the type-bars has an oblique position in the typewriter; and said temporary studs 20 insure that said segment shall have the proper obliquity relatively to said table 21. The typewriter frame is also otherwise correctly located with reference to said table. The details of the means for locating and retaining the typewriter upon said table 21 will presently be described.

Also carried by the pedestal 24 is a bed 25 upon which the type 18 is supported, face down, during the soldering operation. The bed 25 is preferably horizontal, and the position of the type at the soldering operation is also preferably horizontal, and accordingly the machine-gaging table 21 of the jig is inclined a little rearwardly or to the right from vertical position, as at Figure 1. At Figures 1 and 6 the type-bars 12 and types 18 are shown both occupying their printing positions in the tilted typewriter. It will be understood that the type-face when at the printing point is inclined rearwardly when the typewriter is viewed sidewise in normal position; and the type 18 is accordingly supported in its printing position upon the soldering bed 25 in precisely the correct relation to the typewriter frame.

The soldering bed 25 may be supported by means of a frame 26 extending upwardly and forwardly from a flange 27 that is secured by bolts 28 to a downward extension 29 of table 21, said flange 27 being fitted to the surface of said table, so as to give the soldering bed 25 the requisite angle to the table.

Upon the soldering bed 25 is mounted a type-carrying slide 30, whose side edges 31 are confined by plates 32, the latter secured by screws 33 to the bed 25. This arrangement permits the slide to be pulled forward from soldering position, for convenience in inserting the type units. The slide may be guided for horizontal movement or parallel with the face of the type 18, but other constructions and mountings of the type-carrier may be adopted.

The cradle to which is temporarily attached the type, for the purpose of enabling the latter to find its soldering position quickly and accurately, is designated as 34, Figure 10, and preferably consists of a block, plate, chase, frame or other mount. This block may be rectangular throughout, and is accurately finished, so that it may be readily positioned on the bed 25 by means of gages, which will presently be described.

Preferably the upper face of the cradle or gaging-block 34 is formed with letters or characters 35, to form a matrix, into which fit the faces 19 of the type, which are individual to that cradle; each cradle preferably having a different matrix from the others. When the type is pressed to its seat in the matrix, it necessarily results that the type is accurately located upwardly or downwardly, and sidewise, and also brought to a level, relatively to the cradle, and hence relatively to the gages against which the cradle is set, and hence relatively to the typewriting machine which is rigidly connected to the jig structure.

The type and the cradle or mount may be held together by means of a clamp, the latter seating the type in a manner to secure super-accuracy, and to insure parallelism of the type-face with the under or gaging side of the cradle or gaging-block. At Figure 13 the cradle or block 34 is seen to occupy a position between a point 36 of a clamping screw 37 and a type-holder which comprises opposing inclined cheeks 38, 39, forming a seat for the beveled type 18. The beveling of the type is indicated at 40, Figure 8, and the type-engaging cheeks 38, 39 have corresponding obliquity 41. The type is brought to a seat between said jaws and firmly clamped by the screw 37. The upward pressure of the screw point 36 against the cradle, block or mount 34 not only firmly seats the type between the cheeks 38, 39, but also secures the accurate engagement between the block 34 and the type-face 19 that has been mentioned. Said point 36, as will be seen at Figure 8, exerts upward pressure in a line 42 perpendicular to the type-face and equidistant from the sides of the type 18, as well as from the ends thereof, so that relative rocking or skewing of one side of the type away from the mount or chase is prevented, and a level relationship is insured. Subsequent accurate positioning or gaging of the cradle therefore insures a like accurate positioning of the type in the soldering jig.

The type, its cradle, and the clamp which holds them together, form a unit which is bodily inserted in the soldering jig. Said unit is set into place upon the portion of the jig which consists of the slide 30. The ends of the cradle or gaging-block 34 rest upon four separated gages in the form of studs 43, which are now preferably equidistant from the type 18, and also preferably equidistant from a transverse line 44 which intersects the center of the type-head 18. These gage-studs 43 are placed at points remote from the type, so that if there should be any inaccuracy in the height of any of the studs, there will be less inaccuracy in the variation of the type itself from a true level position. The necessity of bending, twisting and springing the type-bars to bring the types "on their feet" is largely eliminated. Said studs may be correctly made and set, so that they lie in the same horizontal plane, and hence the cradle or gage-block 34 may rest correctly upon all four of them, being firmly there held by spring tongues 45, the latter secured by screws 46 upon studs 47 rising from the bed plates 32 at the sides of the slide 30. These spring tongues may engage the plate 34 as it is advanced upon the slide 30, and thereby be caused to hold down said plate firmly upon the gages 43 during the soldering operation. Said tongues are preferably midway between said studs at each side of the jig, in order to insure constant firm contact of the gage-block 34 on all said studs throughout the soldering operation.

It will also be perceived that the cradle or gage-block, with the type and clamp fixed thereto, occupies a position between guide-posts 48, which constitute gages to prevent endwise play of the cradle. Two pairs of studs 49 also form gages to prevent play of the cradle and type in a direction longitudinal of the type. The type is so located with the aid of these gages that the necessity of subsequently lengthening, shortening or sidewise bending of the type-bars is practically avoided. The springs 45 may have flaring edges to permit the gage-block 34 to advance thereunder; or the advancing edge of the block may be slightly beveled or rounded, as will be understood, to slip under the springs.

The aforesaid clamping screw 37, Figure 8, is threaded through a single jaw 50, which co-operates with the pair of checks 38, 39, forming the opposite member of the type-and-cradle clamp, Figure 13. Said cheeks 38, 39 may be carried on opposite separated arms 51, which may be U-shaped to give clearance for the block 34. Said arms 51 are separated so as to leave a clear passage for the type-bars to swing into the slots in the types, said slots being exposed for this purpose. To afford a supporting means for the cheeks 38, 39, so that they will not be excessively spread as the type-head is forced up between them, and to permit fine adjustment of said cheeks towards each other, there may be provided a clip 52, having opposite clip members 53, between which the cheeks 38, 39 are placed. A set screw 53ª is provided in each clip member 53, and these set screws are turned in to bear against the outer faces of the cheeks 38, 39 to support them as the type is forced to its seat between them. These screws permit adjustment so as to force the cheeks 38, 39 to approach more or less, to regulate the extent between which the types 18 can be forced up between said cheeks; but in this case the position of the type in the jig depends upon its close contact with the cradle, which in turn is accurately positioned in the jig.

In mounting the up-ended typewriting machine upon the soldering fixture, its forward temporary feet or gaging devices 20 rest directly upon the table 21, while the rear temporary feet 20 rest upon slide 54, which is mounted in a guiding groove 55 in the front face of table 21, for adjustment horizontally endwise or to left and right; the typewriter frame having its keyboard end uppermost and being connected to said slide to move therewith. The slide is provided near its ends with a pair of horizontal gaging abutments 56, against which rest the rear edges of sheet-metal plates 57, which form the opposite side-walls of the inner framework 10 of the typewriter. By this means the typewriting machine is gaged and supported vertically. One of the abutments 56, preferably that at the right hand, is also provided with a gage stud 58, against which is gaged laterally the right-hand side wall 57 of said inner framework. Hence, by means of the studs 20, the gaging abutments 56 and the lateral gaging stud 58, the typewriter is gaged exactly with reference to the type-soldering jig or bed 25, so that the type-bar segment 14 in the typewriter occupies a true position relatively to the set of gages on the soldering bed 25, or the type-carrying slide 30 thereof. Thus a high degree of accuracy is secured; and soldering the types to the type-bars in this manner is found to result in practically perfect type impressions being made on the work-sheet, with practically perfect alignment.

In order to set the slide 54 a little to the left or right for the purpose of gaging the type-bar segment 14 into exactly central position, a nut 59 may be turned forwardly or backwardly upon a threaded stud 60, fixed to the table 21 by means of a pin 61; a compression spring 62 tending to return or move the slide to the right against nut 59. This compression spring occupies a seat 63 in the edge of the table 21, and bears against a flange 64 turned back from the end of the slide 54.

For aiding in bring the typewriting machine to exact position in the soldering fixture, and holding it there during the soldering of the types seriatim, there may be employed a draw-spring 65, which extends from a stud 66 on the rear of the bed 21, and has a hook 67 to catch over the front bar 68 of the other frame work 11 of the typewriting machine, thereby holding the forward feet 20 of the typewriting machine down upon the bed. The spring extends diagonally at Figure 1, and therefore also tends to hold the typewriter frame down or back against the gage studs 56, which support it.

This effect is augmented by another draw-spring 69, which extends from a stud 70 on the right-hand end of the slide and has a hook 71 to catch over the right-hand side-wall 57 of the framework. This spring 69 is doubly diagonal, and therefore holds the rear typewriter feet down upon the table 21, and also holds the frame down against the adjacent gage abutment 56, and also towards the right against the gaging stud 58. There may also be provided an opposite diagonal spring 72 at the opposite side of the typewriting machine, to extend from a fixed stud 73 to catch over the typewriter framework, and hold this corner of the machine down upon the table 21 and down against the left-hand abutment 56. The spring 72 should be of lighter tension than the spring 69, so as not to overcome the tendency of the latter to draw the typewriter frame to the right against the gaging stud 58. The slide 54 may be held in its guideway by means of bolts 74 and washers 75; the bolts extending through longitudinal slots 76 in the slide, and being threaded into the table 21.

For securing up-and-down adjustment or gaging of the soldering jig or the bed 25, the base 27 whereof rests upon the face 21 of the main table, there may be employed a screw 77, threaded into a hole 78 in the lower edge of flange 77ª, and prevented from moving endwise by means of a fork 79 fixed by a screw 80 against the lower edge of extension 29, said fork fitting between collars 81 formed upon the screw. By turning the screw 77, a fine adjustment may be secured of the type-soldering jig to raise and lower the same, and hence gage the type 18 held thereon to precisely its printing height, which is a matter of importance in causing the type to print evenly or levelly upon the work-sheet. It will be understood that if the type-bed 25 should be gaged too high, the bar 12 would not have to be swung so far in order to reach the type. In other words, the stroke of the type-bar from normal position to soldering position in the soldering apparatus, would be shorter than its subsequent printing stroke in the finished typewriter, and hence the type-face, when printing, would lie at an angle to the platen, and hence one edge of the type impression would appear heavier than the opposite edge. A corresponding defect would appear if the type-bed 25 were too low. These discrepancies can be overcome by delicate adjustment of the screw 77; and the bolts 28 hold the type-soldering jig wherever adjusted by the screw 77. Such adjustment is in a direction about vertical to the face of the type held in the jig.

After the type while held in horizontal position is soldered to the type-bar, the type-clamping screw 37 is withdrawn, thus releasing the type-cradle 34 from the type, and also releasing the type from the seat 38, 39, so that slide 30 may be pulled forwardly and the type clamp withdrawn from the jig, and replaced by another unit comprising a different type and its cradle with the same or another clamp. Thereupon the slide or type-carrier 30 may be pushed backwardly until a stop 82 fixed upon the front end thereof engages an adjustable screw stop or gage 83, threaded into the front edge of the bed 25. This gage 83 may locate the slide 30, and hence the cradle or gage-block 34, in exact position in the jig in a direction longitudinally of the type, or about vertically of the table 21, that is, towards and from said table. When it is in its soldering position, the type extends about vertically to the table. The slide may be held against the gage 83 by means of an arm 84 pivoted at 85 to the bed 25, and held by a spring 86 against the front edge of the slide; said arm having an anti-friction roller 87 to run upon the bottom and the front edge of the slide. The stop 83 has a shank 88, which is secured in the slide 30 by means of a pin 89.

At Figures 3, 4 and 5, are illustrated diagrammatically and in an exaggerated manner, imperfections in the forms of the type-bars, which are usually the result of the processes of manufacturing and handling the bars. Owing to these imperfections, the bars or blanks are presented inaccurately to the types as the latter are held exactly in printing position in the soldering jig. The slots in the type-bars are made over-size, to permit the type-bars to enter the slots in an unsprung condition, that is, in exactly the positions which the type-bars will occupy when subsequently printing upon the work-sheet. The discrepancy between the imperfect type-bar and the perfectly gaged type is taken up by the solder at 90. This solder compensates for imperfections of every kind, whether consisting of a lateral bend in the type-bar, as at Figure 3, or a twist, as at Figure 4, or a misposition of the bar, as at Figure 5, as well as for discrepancies produced by a combination of two or more of these and other usual defects.

At Figures 14 and 15 is illustrated a method of giving the type-bars or blanks a preparatory truing up. This shows a jig or fixture similar to that shown at the other figures of the drawings, except that in place of the type-cradle there is employed a gage 90ª having a slot 91, whose position is the same on the general fixture as that occupied by the slot of the type at the other views. This gage slot 91, however, is preferably a little narrower than the slot in the type, so that the type-bar when properly adjusted may fit closely to the gage slot. The typewriter frame may be placed in this fixture at Figure 1, and the type-bars 12, one after another, may be bent, twisted, and otherwise brought to position to move with suitable freedom into and out of the narrow gage slot 91. Thereupon a soldering jig may be substituted for the slotted gage, or the typewriter may be removed therefrom and set upon a soldering fixture as shown in the other views, for the purpose of soldering the types therein.

Variations may be resorted to within the scope of the invention, and portions of the improvements may be used without others.

Having thus described my invention, I claim:

1. A jig for holding in a predetermined position the general framework of a typewriting machine having swinging type-bars therein, so that each type-bar may be swung to its printing position, said jig also comprising means whereby the types for said bars may be brought seriatim to their exact finally aligned printing positions vertically, laterally and levelly, and each held there while the associated type-bar is soldered thereto in a manner to maintain the alignment and leveling of the type.

2. A soldering apparatus for the types of typewriting machines, having means for supporting and accurately locating the main framework of a typewriting machine with its type-bar system, and also comprising means whereby the types may be mechanically located seriatim, in substantially final and precisely exact vertical and sidewise alignment and precisely level and there held during the soldering of the type-bars thereto in a manner to maintain the alignment and leveling of the types.

3. A jig for soldering types having over-width type-bar slots, comprising means for mechanically and exactly gaging and means for clamping in substantially final vertical and sidewise alignment and leveling the types seriatim at a common position relatively to the type-bar system in a typewriter, said gaging and clamping means exposing the slots in the types and leaving a free passage for the type-bars to be swung seriatim to the types to be soldered therein.

4. A jig for soldering types having oversize type-bar slots, comprising means for mechnically and exactly gaging and means for clamping the type seriatim at a common position relatively to the type-bar system in a typewriter, said means including a set of separately and mechanically-gaged cradles or devices to which the types are respectively fitted by means of their type-faces, said gaging and clamping means exposing the slots in the types and leaving a free passage for the type-bars to be swung seriatim to the types to be soldered thereto.

5. A soldering jig having means for connection with the type-bar system of a typewriting machine, and also having releasable means for holding sets of types accurately and finally aligned or precisely fixed in vertical, lateral and level relation, in printing positions, one type at a time, while the type-bars are swung seriatim each to its type and soldered thereto in a manner to maintain the alignment and leveling of the types.

6. A type-soldering jig or fixture having means for connection with a typewriting machine, and also having means, including gages, for mechanically and accurately locating a succession of types vertically sidewise and levelly by means of their type-faces relatively to the common center or printing point of the typewriting machine, and holding the types while type-bars are successively swung into position for soldering them to the types in a manner to maintain the alignment and leveling of the types.

7. A soldering apparatus for fastening the type-bars to the types of a writing machine, comprising a set of matrix devices, means for fastening the types in said matrix devices, and means for co-operating with said matrix devices for locating the types successively in soldering position.

8. A soldering jig, fixture or apparatus having means for connection with the type-bar system of a typewriting machine, and comprising matrix means to co-operate with corresponding means on the type-faces for mechanically locating the types accurately and fastening them in position during the soldering operations.

9. A soldering cradle for a typewriter type, having formed thereon means for interengaging with the face of the type, whereby the type is accurately locatable with reference to said cradle, means to hold the type rigidly upon the cradle, and a jig having devices for locating said cradle to bring the type mechanically and accurately to printing position vertically, sidewise and levelly preparatory to soldering a type-bar thereto.

10. A type-soldering apparatus comprising means to interengage with the pressed faces of a set of types, for locating them seriatim accurately at the printing center of a set of type-bars, and means to co-operate with the types to seat them accurately and in level relation upon said locating means and hold them there during the soldering operations.

11. A type-soldering fixture having means for attachment with the type-bar system of a writing machine, and having a gaging cradle or means to interengage with the face of a type for locating the same, and means for releasably seating said type upon said cradle and holding it there while a type-bar is soldered thereto.

12. A type-soldering fixture having means for attachment with the type-bar system of a writing machine, and having a gaging cradle or means to interengage with the face of a type for locating the same, and means for releasably seating said type upon said cradle and holding it there while a type-bar is soldered thereto, said cradle comprising portions to gage the type both vertically and laterally and in level relation.

13. A type-soldering apparatus comprising means attachable to the type-system of a typewriting machine for gaging the types successively, by engagement with the type-faces thereof, vertically, laterally and in level relation, and holding the types in such position while the type-bars are swung seriatim to the types and soldered thereto.

14. A type-soldering apparatus comprising means attachable to the type-system of a typewriting machine for gaging the types successively, by engagement with the type-faces thereof, and means for releasably pressing the types individually upon said gaging means, to bring each type into precisely accurate position vertically, laterally and levelly.

15. A type-soldering apparatus having means whereby it may be connected with the type-system of a typewriting machine, said apparatus having means for gaging successively the types in a set by means of engagement with the type-faces of the types, and releasable means for pressing the types against said gaging means to locate the types accurately vertically, laterally and levelly while the type-bars are soldered thereto.

16. A temporary mount or cradle for a typewriter type, comprising means for interengaging with cameo portions on the type-face of the type, and a releasable clamp for forcing the type against said mount.

17. A temporary mount or cradle for a typewriter type, comprising means for interengaging with cameo portions on the type-face of the type, and a releasable clamp for forcing the type against said cradle, said cradle provided with portions to fit locating gages in a soldering jig, whereby the type may be accurately located in soldering position by seating the cradle, with the type thereon, against the gages.

18. A typewriter jig provided with a temporary location-finder in the form of a frame, mount or cradle, to which the face of the type is fitted, and means clamping the type and the location-finder together.

19. A type-soldering apparatus comprising a set of separate location-finding gaging cradles for a set of types for use upon a common set of gages, and means securing the types individually thereto.

20. A type-soldering apparatus comprising a set of location-finding cradles for a set of types, means to secure the types to the cradles, and a jig having gages to co-operate with all of said cradles, said jig having means for connection with the type-bar system or framework of a typewriting machine.

21. A type-soldering apparatus comprising a set of location-finding cradles for a set of types, a jig having a single set of gages common to all of said cradles, said jig having means for connection with the type-bar system or framework of a typewriting machine, said cradles each in the form of a gage-block having depressed faces or characters to fit to the type-face, and means to secure the types to the cradles.

22. A type-soldering apparatus comprising a set of location-finding cradles for a set of types, and a jig having gages to co-operate with all of said cradles, said jig having means for connection with the type-bar system or framework of a typewriting machine, said cradles each in the form of a rectangular gage-block having depressed faces or characters to fit to the type-face, said jig having levelling gages upon which the cradle seats and also gages to locate the cradle vertically and laterally of the type.

23. A type-soldering apparatus comprising a set of location-finding cradles for a set of types, and a jig having gages to co-operate with all of said cradles, said jig having means for connection with the type-bar system or framework of a typewriting machine, said cradles each in the form of a rectangular gage-block having depressed faces or characters to fit to the type-face, said jig having levelling gages upon which the cradle seats and also gages to fit the cradle vertically of the type and gages to fit the cradle laterally of the type.

24. In a soldering apparatus, in combination, a matrix cradle, and means for securing a slotted typewriter type to the matrix cradle, comprising co-operating jaws, one jaw having a beveled seat for the beveled sides of the type, and the other jaw having a cradle-engaging screw-point whose axis is vertical to the type-face and central thereof.

25. In a type and type bar soldering apparatus, in combination, a matrix cradle, and means for securing a slotted typewriter type to the matrix cradle, comprising co-operating jaws, one jaw having a beveled seat for the beveled sides of the type, and the other jaw having a cradle-engaging screw-point whose axis is vertical to the type-face and central thereof, said seat comprising a pair of arms having beveled cheeks, said arms being separated to permit type-bars to be swung into the slots in the types held by said arms.

26. In a soldering apparatus, means for securing a slotted typewriter type to a matrix cradle, comprising co-operating jaws, one jaw having a beveled seat for the beveled sides of the type, and the other jaw having a cradle-engaging screw-point whose axis is vertical to the type-face and central thereof, said seat comprising a pair of separated arms having beveled cheeks and a clip for said cheeks.

27. In a soldering apparatus, means for securing a slotted typewriter type to a matrix cradle, comprising co-operating jaws, one jaw having a beveled seat for the beveled sides of the type, and the other jaw having a cradle-engaging screw-point whose axis is vertical to the type-face and central thereof, said seat comprising a pair of separated arms having beveled cheeks and a clip for said cheeks, said clip having adjustable screws to engage said arms to prevent separation of the cheeks.

28. A location-finding mount for a slotted typewriter type, comprising a matrix-faced gage-block and a clamp which holds the type and gage-block together in a manner to leave the slot exposed for soldering a type-bar therein.

29. A location-finding mount for a slotted typewriter type, comprising a matrix-faced gage-block and a clamp to hold the type and gage-block together, said clamp comprising co-operating jaws whereof one has a beveled seat to receive the beveled sides of the type, and the other has a device which presses against the gage-block in a manner to leave the slot exposed for soldering a type-bar therein.

30. A location-finding mount for a slotted typewriter type, comprising a matrix-faced gage-block and a clamp to hold the type and gage-block together, said clamp comprising co-operating jaws whereof one has a beveled seat to receive the beveled sides of the type, and the other has a device which presses against the gage-block in a manner to leave the slot exposed for soldering a type-bar therein at a point central of the type, to bring the type and block into co-operative relation and thereby exactly pre-determine the position of the type at the soldering operation, said pressing device comprising a set screw in the other jaw of the clamp and provided with a point located centrally of the type.

31. A typewriter soldering jig comprising an upwardly and rearwardly inclined bed for the up-ended framework of a typewriting machine, and a horizontal soldering bed having a gage to fit a cradle attached to a type, said soldering bed occupying a position in front of said inclined bed.

32. A typewriter soldering jig comprising an upright bed against which the base of the machine may be gaged, said bed having a downward extension, and a horizontal type-soldering bed supported by means of an arm which extends upwardly and forwardly, and which has at its lower portion a flange secured to said downward extension and fitted thereto to secure the right relationship between the type-soldering bed and the machine-gaging bed or table.

33. In a jig for soldering the types in a typewriting machine, the combination with a bed, of a common carrier connected thereto and provided with means to receive and gage seriatim each of a set of types attached to individual gaging blocks or cradles, said carrier movable into and out of type-soldering position.

34. An apparatus for soldering a set of types seriatim to the type-bars of a writing machine, comprising a jig, said jig having a bed provided with a slide or carrier, said carrier having gaging means, a set of location-finding cradles or gage-blocks for the types, and releasable means for securing the types to the cradles, said cradles adapted to be gaged upon said gaging means, whereby a type may be attached to a cradle and the cradle deposited upon the gaging means, and the carrier and type moved to soldering position, and the type soldered to the type-bar, the cradle released from the type, the carrier moved away from soldering position, and the type-bar swung back.

35. A type-gaging cradle in the form of a straight edged rectangular plate, the edge faces of the plate at right angles to the broad faces thereof, said plate having on one broad face beveled devices to interengage with corresponding beveled devices on the face of the type, for locating the latter vertically, laterally and levelly.

36. A typewriter type soldering apparatus comprising means for gaging the framework of a typewriting machine, and also comprising a type-cradle or gage-block and means for clamping the type to said gage-block with the face of the type against the block, and a set of gages to co-operate with the gage-block.

37. A typewriter type soldering apparatus comprising means for gaging the framework of a typewriting machine, and also comprising a type-cradle or gage-block and means for clamping the type to said gage-block with the face of the type against the block, and a set of gages to co-operate with the gage-block, said gage-block having beveled devices to interengage with corresponding devices formed upon the face side of the type.

38. A typewriter type-soldering apparatus comprising means for gaging the framework of a typewriting machine, and also comprising a type-cradle or gage-block, said gage-block having beveled devices to interengage with corresponding devices formed upon the face side of the type, and means for clamping the type to force it into registration upon said block vertically, laterally and levelly.

39. A typewriter type soldering apparatus comprising means for gaging the framework of a typewriting machine, and also comprising a type-cradle or gage-block, said gage-block having beveled devices to interengage with corresponding devices formed upon the face side of the type, means for clamping the type to force it into registration upon said block vertically, laterally and levelly, the width of said gage-block being substantialy in excess of the width of the type, and gaging devices positioned to contact with said gage-block.

40. A typewriter type soldering apparatus comprising means for gaging the framework of a typewriting machine, and also comprising a type-cradle or gage-block, said gage-block having beveled devices to interengage with corresponding devices formed upon the face side of the type, means for clamping the type to force it into registration upon said block vertically, laterally and levelly, the width of said gage-block being substantially in excess of the width of the type, gaging devices positioned to contact with said gage-block, the gage-block engaging the gaging devices at points remote from the type, and means being employed to bring the type mechanically into exact rectitude respecting said gage-block.

41. A soldering unit comprising a typewriter type to be soldered, a gage-block, cradle or location-finder, and a clamp to hold the type releasably against the gage-block.

42. A soldering unit comprising a typewriter type to be soldered, a gage-block, cradle or location-finder, and a clamp to hold the type releasably against the gage-block, means being included to insure against relative misplacing of the type and gage-block in any direction.

43. A unit for insertion into a soldering jig comprising a typewriter type to be soldered, a gage-block, cradle or location-finder, and a clamp to hold the type releasably against the gage-block, the dimensions of said gage-block laterally and vertically of the type being substantially greater than the corresponding dimensions of the type.

44. A soldering unit comprising a typewriter type to be soldered, a gage-block, cradle or location-finder, a clamp to hold the type releasably against the gage-block, the dimensions of said gage-block laterally and vertically of the type being substantially greater than the corresponding dimensions of the type, and a soldering fixture having gaging means to engage said gage-block at its borders.

45. A type-holder comprising a gaging cradle fitted to the type face of the type, and a clamp for releasably connecting the type to the cradle to form a unit for insertion into a soldering jig.

46. A typewriter type soldering apparatus comprising gaging devices set too far apart to co-operate directly with a type, a gage finder or cradle, and means to attach the gage finder to the type, to form a unit suitable for co-operation with said gaging devices.

47. A typewriter type-soldering apparatus comprising gaging devices set too far apart to co-operate directly with a type, a gage finder or cradle, and means to attach the gage finder to the type to form a unit of sufficient size for co-operation with said gaging devices, said attaching means being releasable, and said gaging means being mounted for movement into and out of soldering position.

48. In combination, a type-gaging block and a clamp for clamping it to a type, said clamp comprising both a seat for the type and an opposing jaw having a set-screw engaging the gage-block to cause the latter to press the type to the seat.

49. In combination, a type-gaging block and a clamp for clamping it to a type, said clamp comprising both a seat for the type and an opposing jaw having a set-screw engaging the gage-block to cause the latter to press the type to the seat, the axis of said screw being perpendicular to the face of the type and midway between the ends and also midway between the sides thereof.

50. In combination, a type-gaging block and a clamp for clamping together a bevel-sided type and said gage-block, said clamp comprising both a seat for the type and an opposing jaw having a set-screw engaging the gage-block, the seat having a beveled form to fit the sides of the type.

51. In combination, a type-gaging block and a clamp for clamping together a bevel-sided type and said gage-block, said clamp comprising both a seat for the type and an opposing jaw having a set-screw engaging the gage-block, the seat having a beveled form to fit the sides of the type, the axis of said screw being perpendicular to the face of the type and midway between the ends and also midway between the sides thereof.

52. In combination, a type-gaging block and a clamp for clamping together a bevel-sided type and said gage-block, said clamp comprising both a seat for the type and an opposing jaw having a set-screw engaging the gage-block, the seat having a beveled form to fit the sides of the type, said beveled seat comprising opposite beveled cheeks formed upon separate arms, and a clip for supporting said arms.

53. A clamp for clamping together a type and a gage-block, comprising both a seat for the type and an opposing jaw having a set screw to engage the gage-block, the seat having a beveled form to fit the sides of the type, said beveled seat comprising opposite beveled cheeks formed upon separated arms, and a clip for supporting said arms, said clip having a set screw capable of effecting fine adjustment of the arms towards each other.

54. In a typewriter type soldering jig, the combination of a carrier movable into and out of soldering position, a set of gages upon which to rest a type-gaging block, means to hold the block upon said gages, gages for the ends of the type-gaging block, and gages for the sides of the type-gaging block.

55. In a typewriter type soldering jig, the combination of a carrier movable into and out of soldering position, a set of gages upon which to rest a type-gaging block, means to hold the block upon said gages, gages for the ends of the type-gaging block, gages for the sides of the type-gaging block, and springs for holding said gaging block upon said gages.

56. The method of swinging the blank type-bars of a typewriting machine, one after another, to central printing position, and there soldering each bar to its type while the latter is rigidly held by other means than the type-bar in precisely exact printing position relatively to the framework of the typewriting machine.

57. The method of mounting types upon type-bars, comprising rendering a set of types unfitting to the bars by providing the types with overwidth slots, inserting type-bars having varying inaccuracies seriatim in the slots while the types are accurately held independently of the type-bars and in conditions of final alignment at the printing point of the type-bars, and filling with solder the irregular excessive interstices between the type-bars and the sides of the slots, so as to substantially nullify the tendency of the type-bars, because of the slight malformations therein, to cause the types to print out of alignment or to make uneven impressions.

58. The method of mounting types, comprising constructing the types so that they may fit loosely to the type-bars, securing a slotted gage at the printing point to the framework of a typewriting machine, swinging the type-bars one after another to said gage, fitting them to the slot of said gage with approximate accuracy, securing to said typewriter framework seriatim a set of types for said type-bars, so that each type occupies the correct printing position relatively to said typewriting machine, and taking up the loose fit of the type-bars by solder which attaches the types to the bars and secures accuracy of the printing positions of the types notwithstanding inaccuracies that may exist in the type-bars.

59. The method of mounting typewriter types upon type-bars, comprising rendering the types unfitting to the bars by providing the types with overwidth slots for receiving the bars, locating said types seriatim by forcing them into co-operation by means of their faces with interengaging locating means, thereby precisely locating and rigidly holding each type wholly independently of its type-bar vertically, laterally and levelly with reference to the printing point of a set of type-bars, swinging the type-bars seriatim to attaching positions with reference to said types, so that the type-bar tips assume various positions in said slots, due to imperfections in production and mounting of the type-bars, and filling up the varying excesses of spacing between the inaccurately shaped and placed type-bars and the accurately placed types by means of solder.

60. The method of attaching a type to a type-bar unfitted or fitting loosely thereto, comprising pressing the face of said type to a seat fitted thereto, by means of pressure applied vertically to the type in a line between its ends and between its sides, said pressure being independent of the type-bar to bring the type into level position and into correct location vertically and laterally, and soldering the type-bar thereto while the type is held in such position.

61. The method of fastening a set of types individually to separate cradles, to form separate units, inserting and gaging said units, one after another, in a jig, and swinging the type-bars seriatim to the types and soldering them thereto.

62. A type-soldering fixture comprising a table on which to rest the framework of a type-bar typewriter having feet, and means for supporting individual types in printing position in accurately gaged relation to said table preparatory to soldering the bars of the typewriter to said types, said table comprising a slide mounted thereon upon which to rest certain of the typewriter feet, said slide movable relatively to the table, while others of said feet rest directly upon the table; means being provided to retain the typewriter frame upon the slide and table.

63. A type-soldering fixture comprising a table on which to rest the framework of the typewriter, and means for supporting individual types in printing position in accurately gaged relation to said table, said table comprising a slide mounted thereon, said slide having gages for said typewriter framework, and also having means whereby its own position may be gaged.

64. A type-soldering apparatus comprising a set of temporary gaging feet for a type-bar typewriter frame, a table to receive the typewriter frame, means to hold the typewriter frame upon the table, a soldering jig having means to hold the types in printing position in accurately gaged relation to said table preparatory to soldering the type-bars to the types, and means to effect fine adjustment of the typewriting machine transversely to the type-soldering jig, to determine the final and permanent location of the types relatively to the printing point of the typewriter in advance of soldering of the type-bars thereto.

65. A type-soldering apparatus comprising a set of temporary gaging feet for the typewriter frame, a table to receive the typewriter frame, means to hold the typewriter frame upon the table, a soldering jig having means to hold the types in printing position in accurately gaged relation to said table, means to effect fine adjustment of the typewriting machine transversely to the type-soldering jig, said adjustment means comprising a slide mounted to slide transversely of the table, and means for effecting fine adjustments of said slide; said slide having gaging abutments thereon to be engaged by the frame of the typewriter.

66. A type-soldering fixture comprising a table on which to rest the framework of the typewriter, means for supporting individual types in printing position in accurately gaged relation to said table, said table having gaging abutments for the rear of the typewriter frame, and also a gaging abutment for one side of the typewriter frame, and resilient means to hold the typewriter frame upon said table and against said abutments.

67. A type-soldering apparatus comprising a set of temporary gaging feet for the typewriter frame, a table to receive the typewriter frame, means to hold the typewriter frame upon the table, a soldering jig having means to hold the types in printing position in accurately gaged relation to said table, means to effect fine adjustment of the typewriting machine transversely to the type-soldering jig, said adjustment means comprising a slide mounted to slide transversely of the table, and means for effecting fine adjustments of said slide; said slide having abutments to be engaged by the frame of the typewriter, to gage the frame longitudinally and laterally.

68. A fixture for mechanically and permanently aligning types having overwidth type-bar slots, comprising an erect table on which to rest the up-ended framework of a front-strike type-bar typewriter with its keyboard-portion at the top, and means for supporting types individually in horizontal printing position in universally and accurately gaged relation to said table preparatory to soldering them to the type-bars, while making allowance for variations in the printing positions of the unguided type-bars arising from imperfections of manufacture.

69. A type-soldering fixture comprising a table on which to rest the framework of the typewriter, means for supporting individual types in printing position in accurately gaged relation to said table, said table comprising a slide mounted thereon, said slide having gages for said typewriter framework, a threaded device to adjust said slide in one direction, and a spring to move said slide in the opposite direction.

70. A type-soldering fixture comprising a table on which to rest the framework of the typewriter, means for supporting individual types in printing position in accurately gaged relation to said table, said table comprising a slide mounted thereon, said slide having gages for said typewriter framework, and also having means whereby its own position may be gaged, and springs arranged diagonally for holding the typewriter frame down upon the table and slide and also against the gaging abutments on the slide.

71. A type-soldering fixture comprising a table on which to rest the framework of the typewriter, means for supporting individual types in printing position in accurately gaged relation to said table, said table comprising a slide mounted thereon, said slide having gages for said typewriter framework, and also having means whereby its own position may be gaged, and springs arranged diagonally for holding the typewriter frame down upon the table and slide and also against the gaging abutments on the slide, said springs comprising a diagonal spring which holds the typewriter frame down upon the slide and pulls it laterally against a lateral gage on the slide.

72. A type-soldering fixture comprising a table on which to rest the framework of the typewriter, means for supporting individual types in printing position in accurately gaged relation to said table, said table comprising a slide mounted thereon, said slide having gages for said typewriter framework, and also having means whereby its own position may be gaged, and springs arranged diagonally for holding the typewriter frame down upon the table and slide and also against the gaging abutments on the slide, said springs comprising a diagonal spring which holds the typewriter frame down upon the slide and pulls it laterally against a lateral gage on the slide, and also comprising a weaker spring which pulls the typewriter frame in the opposite lateral direction and also holds it down on the slide.

73. A type-soldering fixture comprising a table on which to rest and gage the framework of the typewriter, a single jig for supporting individual types, one after another, in printing position in accurately gaged relation to said table, and means for effecting relative adjustment between said type-supporting jig and said table in a direction longitudinal of the table.

74. A type-soldering apparatus comprising a set of temporary gaging feet for the typewriter frame, a table to receive the typewriter frame, means to hold the typewriter frame upon the table, a soldering jig having means to hold the types in printing position in accurately gaged relation to said table, said soldering jig having a base whereby it is mounted upon said table, and a device for effecting adjustment of said base and jig longitudinally of said table.

75. A type-soldering apparatus comprising a table provided with means for gaging thereon the framework of a typewriting machine, a soldering jig provided with means for gaging the type in a plurality of directions independently of the type-bar, and means for effecting relative adjustment between the soldering jig and the table.

76. A type-soldering apparatus comprising a table provided with means for gaging thereon the framework of a typewriting machine, a soldering jig provided with means for gaging the type in a plurality of directions independently of the type-bar, and means for effecting relative adjustment between the type and the framework of the typewriting machine.

77. A type-soldering apparatus comprising a table provided with means for gaging thereon the framework of a typewriting machine, a soldering jig provided with means for gaging the type in a plurality of directions independently of the type-bar, and means for effecting relative adjustment between the type and the framework of the typewriting machine in directions longitudinally and transversely of the table.

78. A type-soldering apparatus comprising a table provided with means for gaging thereon the framework of a front-strike type-bar typewriting machine, a soldering jig provided with means for supporting and gaging the type in a position about vertical to the table, and means for effecting relative adjustment between the type and the framework of the typewriting machine in directions longitudinally and transversely of the table and longitudinally of the type as it is supported by said gaging means.

79. A type-soldering apparatus comprising means for gaging a type-bar system, a jig for gaging the type in printing position preparatory to soldering the type-bar thereto, and means for effecting adjustment between the type-bar system and the type-gaging jig to vary the printing position of the type-bar or the length of stroke thereof.

80. A type-soldering apparatus comprising means for gaging a type-bar system, a jig for gaging the type in printing position preparatory to soldering the type-bar thereto, and means for effecting adjustment between the type-bar system and the type-gaging jig to vary the angular relation of the type-bar to the type to which it is to be soldered.

81. A type-soldering apparatus comprising means for gaging and holding a type-bar system, a type-soldering jig comprising a slide or carrier movable into and out of working position, type-gaging means provided upon the said carrier, means for securing the type upon said gaging means, and means for gaging the working position of said carrier.

82. A type-soldering apparatus comprising means for gaging and holding a type-bar system, a type-soldering jig comprising a slide or carrier movable into and out of working position, type-gaging means provided upon said carrier, means for securing the type upon said gaging means, means for gaging the working position of said carrier in a direction vertical of the type; and means for effecting relative adjustment laterally between the type-carrier and said means for holding the type-bar system.

83. A type-soldering apparatus comprising means for gaging and holding a type-bar system, a type-soldering jig comprising a slide or carrier movable into and out of working position, type-gaging means provided upon said carrier, means for securing the type upon said gaging means, and means for effecting relative adjustment between the type-carrier and the type-bar system in a direction about perpendicular to the gage of the type.

84. A two-step-soldering apparatus comprising means for supporting a type-bar system in gaged position relatively to a relatively narrow gaging slot for the type-bearing tips of the type-bars, said slot located directly at the printing point of the type-bar system, whereby to accomplish the preparatory step of bending the type-bars individually to fit into said slot, and also comprising other means for subsequently holding said system in gaged relation to a type-soldering jig for soldering the type-bar tips while unconstrained into types having overwidth slots, thereby accomplishing the final step.

85. A type-aligning apparatus comprising means to gage a type-bar system, a set of similar individual matrix-blocks, each comprising a broad plate having a rectangular form for gaging purposes, and a soldering jig comprising a single set of gages to co-operate with said blocks one after another, each block being removable to give place to a succeeding block upon said gages, and means to hold each type and block in gaged position while the type-bar is soldered thereto.

86. A type-aligning apparatus comprising means to gage a type-bar system, a set of similar individual matrix-blocks, each comprising a broad plate having a rectangular form for gaging purposes, and a soldering jig comprising a single set of gages to co-operate with said blocks one after another, each block being removable to give place to a succeeding block upon said gages, means to hold each type and block in gaged position while the type-bar is soldered thereto, said set comprising rests placed close to the edges of the block, the latter being of mammoth dimensions, as compared with the type, and its sides and ends forming gages, and said block having a matrix-face, and means to press the type into the matrix, securing microscopic leveling of the type by reason of the comparatively great distance between said block-supporting rests, as compared with the width and height of the type.

87. The method of attaching and aligning the types of a type-bar typewriting machine, comprising providing the types with overwidth slots, and holding the types seriatim in accurately leveled and accurately gaged vertical and sidewise alignment and accurately leveled at the printing point of a typewriting machine, while the type-bars are inserted seriatim in said slots, occupying therein various inaccurate positions due to their various imperfections, but without filling said slots or displacing the types, and filling up the remaining space in the slots with solder, to secure the type, standing perfectly aligned and leveled at the printing point, to the type-bar which may stand in slightly inaccurate position or imperfect condition at the printing point, whereby, when each type-bar is subsequently operated, it will bring its type back to exactly the same perfect printing position vertically, laterally and levelly.

JOHN B. GRIFFIN.

Witnesses:
H. G. McMULLIN,
HELEN PRATT COWLES.

DISCLAIMER.

1,518,917.—*John B. Griffin*, Newington, Conn. TYPEWRITER-TYPE SOLDERING AND ALIGNING APPARATUS. Patent dated December 9, 1924. Disclaimer filed March 12, 1926, by the assignee, *Underwood Typewriter Company*.

Hereby enters its disclaimer to claims numbered 5, 6, 7, 8, 9, 10, 11, 12, 13, 14, 15, 16, 17, 18, 19, 20, 21, 22, 23, 28, 35, 36, 37, 38, 39, 40, 41, 42, 44, 56, 85, and 86, the right to said claims having been established by George A. Seib in interference proceedings No. 52,331.

[*Official Gazette March 30, 1926.*]